July 21, 1970     W. C. CAVALLO     3,521,540
ELECTRONIC FLASH UNIT FOR CAMERAS ADAPTED TO RECEIVE FLASHCUBES
Filed Aug. 26, 1968
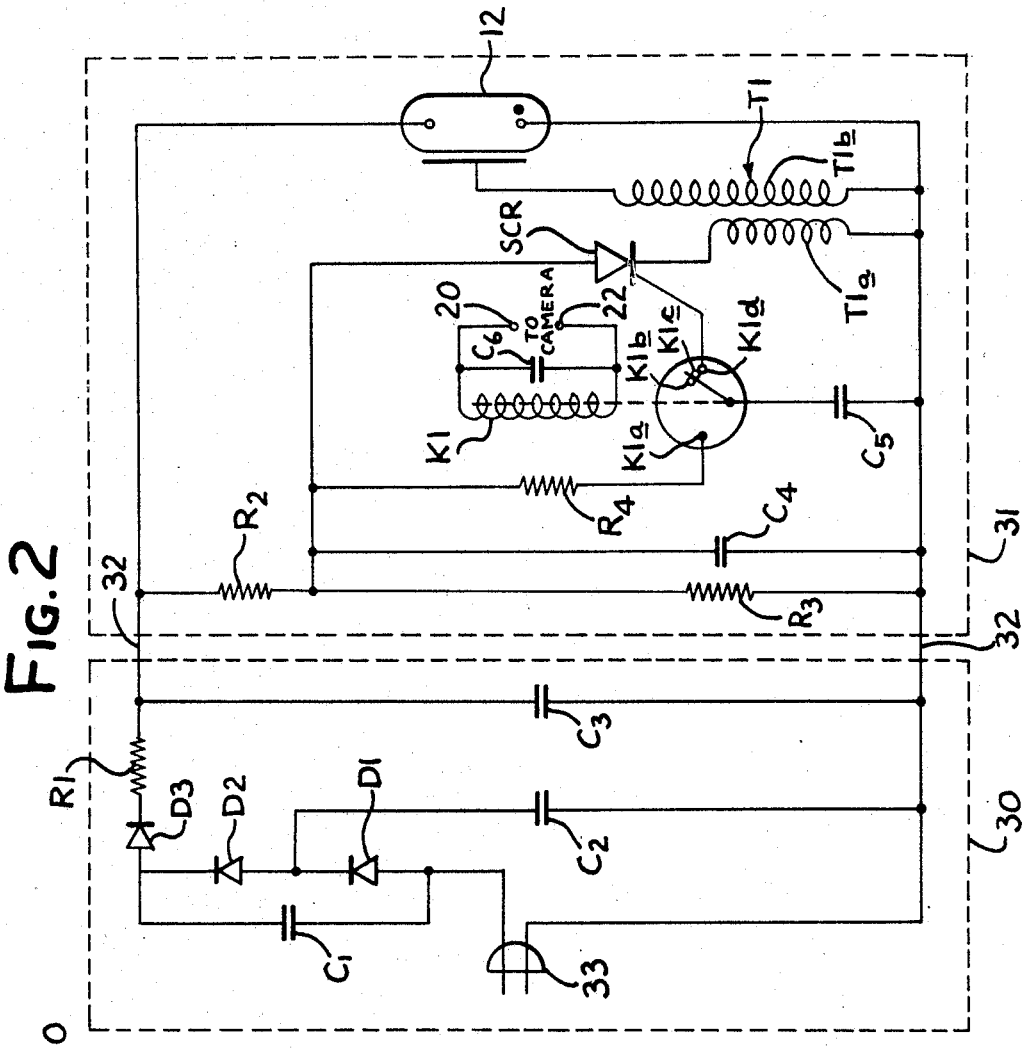
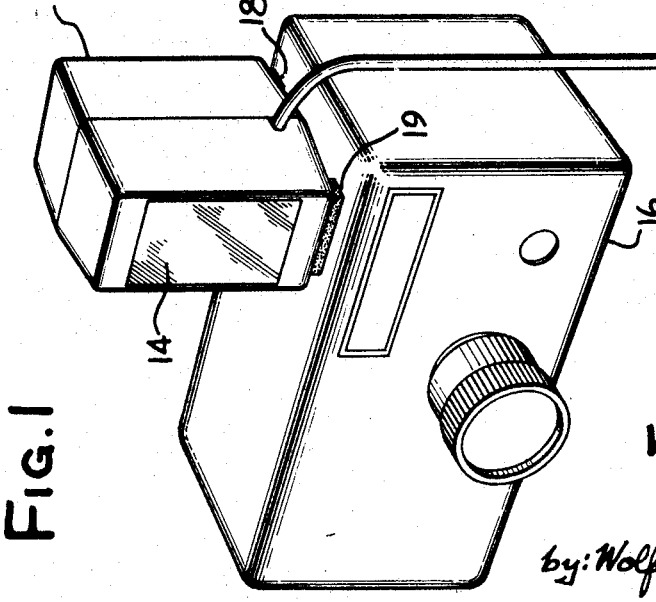
INVENTOR
WILLIAM C. CAVALLO
by: Wolfe, Hubbard, Voit & Osann
ATTYS.

United States Patent Office 3,521,540
Patented July 21, 1970

3,521,540
ELECTRONIC FLASH UNIT FOR CAMERAS ADAPTED TO RECEIVE FLASHCUBES
William C. Cavallo, 2231 Lockport Road, Lockport, Ill. 60441
Filed Aug. 26, 1968, Ser. No. 755,323
Int. Cl. G03b 9/70
U.S. Cl. 95—11.5          8 Claims

ABSTRACT OF THE DISCLOSURE

An electronic flash unit for use with a camera adapted to receive flashcubes. The flash unit includes a circuit for delaying activation of the electronic flashtube following actuation of the camera shutter release so as to synchronize the flash with the opening of the shutter. The circuit comprises an SCR connected between a power supply and the flashtube trigger coil, a capacitor operatively associated with the power supply and the flashtube, and a reed relay responsive to the activating signal from the camera for automatically connecting the second capacitor to the power supply during the presence of the activating pulse from the camera, and then connecting the capacitor to the gate of the SCR so as to render the SCR conductive and thereby fire the flashtube.

---

The present invention relates generally to electronic flash units for use with cameras and, more particularly, to an improved electronic flash unit for use with cameras adapted to receive flashcubes.

In cameras which are adapted for use with flashcubes, an internal circuit including two 1.5-volt batteries is normally provided for producing a flashcube-activating signal in response to each manual actuation of the camera. Because the flashcubes do not reach peak light intensity instantaneously in response to the three-volt actviating pulse generated by the camera circuit, such cameras also normally include shutter control means for automatically delaying the opening of the shutter for a predetermined period following actuation of the camera to synchronize the opening of the shutter with the peak light intensity of the flashcube. Electronic flashtubes such as xenon strobe lights, on the other hand, reach peak light intensity almost instantaneously, and thus it is necessary to delay the firing of such tubes for a period corresponding to the shutter delay period following generation of the normal flashcube-activating signal.

It is the primary object of the present invention to provide an improved electronic flash unit for use with cameras having flashcube receptacles, the flash unit including an improved circuit for synchronizing the electronic flash with the shutter mechanism of the camera.

A more particular object of the invention is to provide such an improved electronic flash unit which provides a controlled delay interval following actuation of the camera by the operator.

It is another object of the invention to provide such an improved electronic flash unit which has a high degree of reliability combined with a long operating life.

A further object of the invention is to provide an improved electronic flash unit of the foregoing type which can be efficiently manufactured at a low cost using a small number of components.

Other objects and advantages of the invention will become apparent upon reading the following detailed description and upon reference to the accompanying drawings, in which:

FIG. 1 is a perspective view of an electronic flash unit embodying the present invention mounted on a camera adapted to receive flashcubes; and FIG. 2 is a schematic circuit diagram of the electronic circuit included in the flash unit of FIG. 1 and embodying the present invention.

While the invention will be described in connection with a certain preferred embodiment, it will be understood that it is not intended to limit the invention to such embodiment but, to the contrary, it is intended to cover all alternatives, modifications and equivalents as may be included within the spirit and scope of the invention as defined by the appended claims.

Turning now to the drawings, there is shown FIG. 1 a flash unit comprising a housing 10 having a conventional electronic flashtube 12 (shown schematically in FIG. 2), such as a xenon strobe light, mounted within a front window or lens 14. A mounting stud (not shown) depends from the bottom wall of the housing 10 to fit into a complementally shaped receptacle in a camera 16 adapted to receive conventional flashcubes. Also mounted on the bottom wall of the housing 10 are a pair of resilient mounting pads 18 and 19, and a pair of electrical contacts 20 and 22 (shown schematically in FIG. 2) for making electrical connection with the internal circuit in the camera for firing the flashcubes. Such internal circuit normally produces a three-volt electrical pulse of predetermined width, typically about 15 to 18 milliseconds, in response to each actuation of the camera shutter release by the user. Also, as mentioned previously, such cameras are normally provided with a shutter control mechanism which delays the opening of the shutter for a predetermined period following generation of the activating pulse in order to synchronize the opening of the shutter with the peak intensity of the light generated by the flashcube. To insure that the flash unit 10 is not rotated by the mechanism provided in the camera for rotating flashcubes, the bottom wall of the housing 10 also preferably forms an integral locking pin which fits between the contacts 20 and 22 in the flashcube receptacle.

For the purpose of firing the flashtube 12 in response to each activating signal generated by the camera at contacts 20 and 22, the flash unit shown in FIG. 1 includes an interval circuit shown in FIG. 2. This circuit comprises a power supply unit 30 which may be conveniently housed in a separate container, and is electrically connected to a flash control circuit 31, contained in the housing 10, by means of an interconnecting cable indicated schematically at 32 in FIG. 2. The power supply unit 30 is adapted to be connected to a 120-volt A-C supply line by a conventional plug 33. The balance of the power supply unit, which does not represent a novel feature of the present invention, comprises three diodes, D1, D2, and D3, a resistor R1, and three capacitors C1, C2 and C3 interconnected to form a conventional voltage tripler for producing approximately 475 volts from the 120-volt supply line.

In accordance withe the present invention, the flash head unit 31 includes electronic switching means operatively connected between the power supply unit and the flashtube 12 for controlling the firing of the tube, and a capacitor operatively connected to the power supply and to a control input of the electronic switching means by means of a second switching means associated with the contacts 20 and 22. The second switching means is responsive to an activating signal generated at the contacts 20 and 22 for automatically connecting the capacitor to the power supply to charge the capacitor during the presence of the activating signal, and is responsive to the termination of the activating signal for automatically connecting the capacitor to the control input of the electronic switching means to discharge the capacitor and thereby render the electronic switching means conductive to fire the flashtube. Consequently, the firing of the flashtube is delayed for a predetermined interval following the initiation of the activating signal, i.e., following actuation of the camera by the user. Thus, referring to FIG. 2, the output voltage from the power supply unit 30 is supplied via the cable 32 across a voltage divider formed by resistors R2 and R3. The energy stored in a capacitor C4 is applied through a silicon controlled rectifier SCR to the primary winding T1$a$ of a pulse transformer T1 whose secondary winding T1$b$ is connected to the control electrode of the flashtube 12.

When an activating signal is generated at the contacts 20 and 22, the coil K1 of a reed relay (form "C") is energized to close relay contacts K1$a$ and K1$b$, thereby connecting a capacitor C5 through a resistor R4 across the resistor R3, which has about 200 volts across it. The capacitor C5 thus begins to charge as soon as the contacts K1$a$ and K1$b$ are closed, so that the charging of the capacitor C5 begins almost simultaneously with the actuation of the camera, i.e., simultaneously with the leading edge of the activating signal generated at the contacts 20 and 22.

In accordance with a further aspect of the invention, an additional, nonpolarized capacitor C6 is connected across the coil K1 of the reed relay to stretch the width of the pulse applied to the coil K1 in response to the activating signal generated at the contacts 20 and 21, thereby increasing the delay interval. When the activating signal generated at the contacts 20 and 22 is terminated, after an interval determined by the width of the activating pulse (typically about 15 to 18 milliseconds), the coil K1 is deenergized, thereby closing contacts K1$c$ and K1$d$. This connects the capacitor C5 to the control electrode or gate of the SCR, thereby rendering the SCR conductive due to the charge on the capacitor C5. When the SCR is rendered conductive, substantially the entire voltage across R3 is applied across the primary winding T1$a$ of the output transformer T1, thereby applying a stepped-up voltage pulse to the control electrode of the flashtube 12 to initiate a flash.

After the capacitor C5 discharges to a predetermined level, the SCR is returned to its nonconductive state to remove the energizing signal from the output transformer T1 and, consequently, from the flashtube 12. At this point, the flash is terminated, and the circuit is in condition to receive the next activating signal generated at the contacts 20 and 22.

It can be seen that the circuit of FIG. 2 delays the firing of the flashtube 12 for an interval corresponding to the width of the activating pulse generated at the contacts 20 and 22, plus the delay effected by the capacitor C6 and the time required for the movable relay contacts K1$b$, K1$c$ to switch from K1$a$ to K1$d$. In a typical application, where the width of the activating pulse generated at the contacts 20 and 22 is about 15 to 18 milliseconds, the total delay interval from initiation of the activating signal to the firing of the flashtube 12 is in excess of 20 milliseconds. This is the same delay interval normally provided by the shutter control mechanism in the camera, so the opening the camera shutter is perfectly synchronized with the firing of the flashtube 12. That is, the flashtube 12 is automatically fired while the camera shutter is open, a predetermined time after the camera shutter release is activated by the user.

Although it is to be understood that the present invention is not limited to any particular values for the various circuit elements, the following is a list of the values employed for the various elements in a preferred embodiment of the illustrative circuit shown in FIG. 2.

| | |
|---|---|
| C1 | 4 mfd., 350 v. |
| C2 | 4 mfd., 350 v. |
| C3 | 300 mfd., 500 v. |
| C4 | .22 mfd., 200 v. |
| C5 | 100 mmfd., 500 v. |
| C6 | 15 to 25 mfd., 6 v., nonpolarized. |
| R1 | 330 ohms, 5 w. |
| R2 | 4.7 megohms. |
| R3 | 3.9 megohms. |
| R4 | 470 K ohms. |

As can be seen from the above detailed description, the present invention provides an improved electronic circuit for synchronizing the electronic flash with the shutter mechanism of a camera adapted for use with flashcubes. The improved circuit provides precisely controlled delay interval between the production of the activating signal in the flashcube circuit and the triggering of the electronic flashtube. Moreover, the circuit provided by this invention combines a high degree of reliability with a long operating life, and can be economically manufactured at a low cost using a small number of components.

I claim as my invention:

1. In an electronic flash unit for use with a camera adapted to receive flashcubes, said camera having a circuit for producing a flashcube activating signal in response to activation of the camera, and shutter control means for delaying the opening of the shutter for a predetermined period following activation of the camera to synchronize the opening of the shutter with the peak light intensity of the flashcube activating signal from the camera, electrical output means including an electronic flashtube and a power supply associated therewith, electronic switching means operatively connected between said power supply and said flashtube for controlling the firing of said tube, said switching means having a control input means for rendering the same conductive and nonconductive, a capacitor operatively associated with said control input means, and relay means operatively connected between said power supply, said capacitor, and said control input means, said relay means being responsive to said flashcube activating signal for connecting said capacitor to said power supply to charge the capacitor during the presence of said activating signal, and for connecting said capacitor to the control input means of said switching means in response to the termination of said activating signal to thereby render said electronic switching means conductive to fire said flashtube, whereby the firing of said flashtube is delayed for a predetermined interval following the initiation of said activating signal.

2. An electronic flash unit as set forth in claim 1 wherein said electronic switching means is a silicon controlled rectifier.

3. An electronic flash unit as set forth in claim 1 wherein said relay means is a reed relay with the mechanical movement of the reed contributing to said predetermined delay interval.

4. An electronic flash unit as set forth in claim 1 which includes a nonpolarized capacitor connected across the coil of said relay means for delaying the response of said relay means to said activating signal.

5. An electronic flash unit as set forth in claim 4 wherein said electronic switching means is a silicon controlled rectifier, and said control input means is the gate of said silicon controlled rectifier.

6. In an electronic flash unit for use with a camera adapted to receive flashcubes, said camera having a circuit for producing a flashcube activating signal in response to activation of the camera, and shutter control means for delaying the opening of the shutter for a predetermined period following activation of the camera to synchronize the opening of the shutter with the peak light intensity of the flashcube, the improvement comprising electrical input means for receiving the flashcube activating signal from the camera, electrical output means including an electronic flashtube and a power supply associated therewith, electronic switching means operatively connected between said power supply and said flashtube for controlling the firing of said tube, said switching means having a control input means for rendering the same conductive and nonconductive, a capacitor operatively connected to said power supply and said control input means by means of second switching means associated with said input means, said second switching means being responsive to said activating signal for automatically connecting said capacitor to said power supply to charge said capacitor during the presence of said activating signal at said input means, said second switching means also being responsive to the termination of said activating signal for automatically connecting said capacitor to said control input to discharge the capacitor and thereby render said electronic switching means conductive to fire and flashtube, whereby the firing of said flashtube is delayed for a predetermined interval following the initiation of said activating signal.

7. An electronic flash unit as set forth in claim 6 wherein said second switching means is a reed delay having an energizing coil adapted for connection to the same to receive the flashcube activating signal, a first fixed contact connected to said control input means of said electronic switching means, and a movable contact connected to said capacitor for connecting said capacitor to said control input means when said coil is deenergized and for connecting said capacitor to said power supply when said coil is energized by said activating signal.

8. An electronic flash unit as set forth in claim 7 which includes a nonpolarized capacitor connected across the energizing coil of said reed relay for delaying the response of said relay to said activating signal.

References Cited

UNITED STATES PATENTS

| | | | |
|---|---|---|---|
| 2,755,714 | 7/1956 | Germeshausen | 95—11.5 |
| 3,364,829 | 1/1968 | Ackerman | 95—11.5 |
| 3,465,656 | 9/1969 | Wick et al. | 95—11.5 XR |

NORTON ANSHER, Primary Examiner

F. L. BRAUN, Assistant Examiner

U.S. Cl. X.R.

240—1.3; 315—241